United States Patent [19]

Morishita et al.

[11] Patent Number: 5,288,840
[45] Date of Patent: Feb. 22, 1994

[54] POLYOXYMETHYLENE COPOLYMER AND PROCESS FOR PRODUCING THE COPOLYMER

[75] Inventors: Hirohisa Morishita; Kazuhiko Matsuzaki, both of Kurashiki, Japan

[73] Assignee: Asahi Kasei Kabushiki Kaisha, Osaka, Japan

[21] Appl. No.: 859,440

[22] PCT Filed: Jan. 17, 1991

[86] PCT No.: PCT/JP91/00039

§ 371 Date: Jun. 2, 1992

§ 102(e) Date: Jun. 2, 1992

[30] Foreign Application Priority Data

Oct. 5, 1990 [JP] Japan .................. 2-266414

[51] Int. Cl.$^5$ .............................................. C08G 14/02
[52] U.S. Cl. ...................... 528/238; 528/232; 528/233; 528/239; 528/242; 528/244; 528/485; 528/489; 524/155; 524/157; 524/158; 524/284; 524/401; 524/745; 524/779; 524/786
[58] Field of Search ............... 528/232, 233, 238, 239, 528/242, 244, 485, 489; 524/155, 157, 158, 284, 401, 745, 779, 786

[56] References Cited

U.S. PATENT DOCUMENTS

| | | | |
|---|---|---|---|
| 3,027,352 | 3/1962 | Walling et al. | 528/241 |
| 3,337,503 | 8/1967 | Schnizer et al. | 528/241 |
| 3,883,450 | 5/1975 | Burg et al. | 528/242 |
| 4,431,794 | 2/1984 | Sadlowski et al. | 528/232 |
| 4,758,608 | 7/1988 | Collins et al. | 522/43 |
| 5,144,005 | 1/1992 | Sextro et al. | 528/480 |

FOREIGN PATENT DOCUMENTS

2149579 3/1973 France .
57-12018 1/1982 Japan .

OTHER PUBLICATIONS

Chemical Abstracts, vol. 104, No. 26, Jun. 30, 1986, p. 16.
Chemical Abstracts, vol. 89, No. 4, Jul. 24, 1978, p. 19.

*Primary Examiner*—John Kight, III
*Assistant Examiner*—S. A. Acquah
*Attorney, Agent, or Firm*—Birch, Stewart, Kolasch & Birch

[57] ABSTRACT

A polyoxymethylene copolymer excellent in stability and mechanical properties which is comprised of oxymethylene units and oxyalkylene units and has a molecular weight of 10,000 to 200,000. The proportion of oxyalkylene units to oxymethylene units is 0.07 to 0.5% by mole and the ratio of the absorbance of terminal formate groups to that of methylene groups determined by infrared spectrophotometry is not more than 0.025. A process for producing the copolymer is also disclosed.

10 Claims, No Drawings

POLYOXYMETHYLENE COPOLYMER AND PROCESS FOR PRODUCING THE COPOLYMER

TECHNICAL FIELD

The present invention relates to a polyoxymethylene copolymer. In more particular, the invention relates to a polyoxymethylene copolymer having a specified terminal group composition and excellent in stability and mechanical properties.

BACKGROUND ART

Polyoxymethylenes synthesized by prior art techniques are classified broadly into homopolymers and copolymers. Polyoxymethylene homopolymers and polyoxymethylene copolymers of the prior art respectively have only one of the two desirable characteristics, namely either excellent mechanical property or excellent stability. That is, polyoxymethylene homopolymers obtained by homopolymerization of formaldehyde or trioxane are excellent in mechanical properties but are not satisfactory in stability; on the other hand, polyoxymethylene copolymers obtained by copolymerization of formaldehyde or trioxane with a cyclic ether or cyclic formal are excellent in stability but are poor in mechanical properties. With respect to long term resistance to heat or resistance to hot water, furthermore, even polyoxymethylene copolymers are not satisfactory.

Polyoxymethylene copolymers are usually obtained by copolymerizing formaldehyde or trioxane with a cyclic ether. U.S. Pat. No. 3,027,352 describes a copolymer obtained by cationically copolymerizing trioxane with ethylene oxide or 1,4-dioxolane.

Further, U.S. Pat. No. 3,337,503 discloses the use of methylal as a molecular weight controlling agent in the polymerization of trioxane. When methylal is used as the molecular weight controlling agent, the terminal group of the resulting polymer becomes the methoxy group.

In the polymerization of formaldehyde or trioxane or the copolymerization thereof with a comonomer using cationic catalyst, hydride shift (i.e., hydrogen abstraction) takes place, which results in scission of the main chain of the polymer and makes it impossible to obtain a high molecular weight polymer. Moreover, it is known that the terminals formed by the scission become the methoxy group and the formate group.

Further, when compounds having hydroxyl groups, such as water, methanol, formic acid, etc., are present in polymerization, they function as a chain transfer agent and form unstable terminal structures. A usually adopted remedial method is to decompose these unstable structures and stabilize the terminal groups as hydroxyethoxy groups, by application of post-treatment after polymerization. In the case of formic acid, however, terminal formate groups are formed simultaneously.

As described above, in the previous polyoxymethylene copolymers, terminal formate groups are formed during polymerization by chain transfer reaction caused by formic acid, which is an impurity in trioxane, and by hydride shift reaction, which is a side reaction caused by cationic catalyst, so that it has been difficult to reduce terminal formate groups.

The present invention relates to a polyoxymethylene copolymer which has both excellent stability and excellent mechanical property. In more particular, the invention relates to a polyoxymethylene copolymer which is excellent in stability and mechanical property and further in long term resistance to heat and resistance to hot water, and to the process for producing the same.

DISCLOSURE OF THE INVENTION

The present inventors have made extensive study on the stability of polyoxymethylene. As the result, they have found that by restricting to a certain range the amount of inserted oxyalkylene units in polyoxymethylene copolymer and the amount of terminal formate groups in the copolymer, a polyoxymethylene copolymer can be obtained which has highly excellent stability and mechanical property and excellent long term resistance to heat and resistance to hot water. The present invention has been accomplished on the basis of above finding.

Thus, the present invention relates to a polyoxymethylene copolymer having a molecular weight of 10,000–200,000 which comprises oxymethylene units ($-CH_2O$) and oxyalkylene units

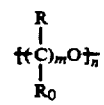

wherein R and $R_0$ may be the same or different and are each selected from hydrogen, an alkyl group or an aryl group, n is 1 to 5, and m is 2 to 6, and wherein (a) the proportion of oxyalkylene units to oxymethylene units is 0.07–0.5% by mole, and (b) in the infrared spectrophotometry of the polymer, the ratio of absorbance of terminal formate groups to methylene groups is not more than 0.025.

The present invention will be described in detail below.

The polyoxymethylene copolymer of the present invention can be obtained by copolymerization, using a cationic catalyst, formaldehyde or trioxane and a cyclic ether represented by the formula

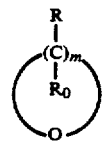

wherein R and $R^0$ may be the same or different and are each selected from hydrogen, an alkyl group or an aryl group; further, R bound to different carbon atoms and $R_0$ bound to different carbon atoms also may respectively be the same or different and are selected from hydrogen, an alkyl group and an aryl group; and m is 2 to 6, or a cyclic formal represented by the formula

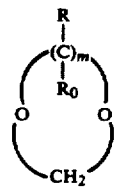

wherein R and $R_0$ may be the same or different and are selected from hydrogen, an alkyl group or an aryl group; further, R bound to different carbon atoms and $R_0$ bound to different carbon atoms also may respectively be the same or different and are selected from hydrogen, an alkyl group or an aryl group; and m is 2 to 6.

As the example of the cyclic ethers used for obtaining the polymer of the present invention, mention may be made of ethylene oxide, propylene oxide, butylene oxide, styrene oxide, etc.

As the example of the cyclic formals, there may be mentioned ethylene glycol formal (1,3-dioxolane), diethylene glycol formal, 1,3-propanediol formal, 1,4-butanediol formal, 1,5-pentanediol formal, 1,6-hexanediol formal, etc. Particularly preferred comonomers are such cyclic formals as ethylene glycol formal (1,3-dioxolane), 1,4-butanediol formal, and the like.

The polymer of the present invention can also be obtained by reacting polyacetal homopolymer and a cyclic ether or cyclic formal mentioned above in the presence of a cationic catalyst.

One of the important points in the present invention is the amount of inserted polyalkylene units in the polymer.

Thus, only when the proportion of inserted oxyalkylene units in the polymer is in the range of 0.07–0.5 mole, preferably 0.1–0.3 mole, relative to 100 moles of oxymethylene units, a polyoxymethylene copolymer is obtained which is excellent in all of the mechanical property, stability and long term resistance to heat and resistance to hot water. When the proportion of inserted oxyalkylene units is less than 0.07 mole, the stability and long term resistance to heat and resistance to hot water become poor. On the other hand, when the proportion of inserted oxyalkylene units exceeds 0.5 mole, the mechanical property becomes markedly poor.

The sequence of oxyalkylene units is also an important point. It is preferable for improving stability, mechanical property, heat resistance and hot water resistance that oxyalkylene units are dispersed in the polymer as individually as possible without forming blocks. As to n, which represents the sequence of oxyalkylene units, it is preferable that the proportion of n=1 is not less than 95% by mole of the whole oxyalkylene units and the proportion of n≧2 is not more than 5% by mole.

The amount of inserted oxyalkylene units and the sequence mentioned above can be determined by heating and decomposing the polymer in an aqueous 3N HCl solution and analyzing the alkylene glycol, dialkylene glycol and trialkylene glycol in the decomposed solution.

Another important point is the amount of terminal formate in the copolymer.

In the present invention, the terminal groups of the polymer are alkoxy groups such as the methoxy (—OCH$_3$) group; hydroxyalkoxy groups

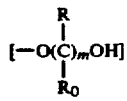

wherein R and $R_0$ may be the same or different and are selected from hydrogen, an alkyl group and an aryl group; further, R bound to different carbon atoms and $R_0$ bound to different carbon atoms also may respectively be the same or different and are selected from hydrogen, an alkyl group and an aryl group; and m is 2 to 6; and formate groups. Terminal groups other than those mentioned above, for example hydroxyl groups bound to oxymethylene units, are very unstable and must be removed by decomposition or converted into hydroxyalkoxy groups by post-treatment after polymerization, e.g. by heat decomposition in the presence of an alkaline substance.

The amount of formate terminal groups in the copolymer can be determined by infrared spectrophotometry of the film obtained by hot pressing of the polymer. The absorption wave number ($v$) due to terminal formate is 1710 cm$^{-1}$ and that due to the methylene group of polyoxymethylene main chain is 1470 cm$^{-1}$. The amount of terminal formate groups in the copolymer can be expressed by the ratio of these absorbances, $D_{1710}/D_{1470}$.

The amount of formate groups in the copolymer of the present invention should be not more than 0.025, preferably not more than 0.020, in terms of $D_{1710}/D_{1470}$. When $D_{1710}/D_{1470}$ is higher than the value, the stability, heat resistance and hot water resistance of the copolymer are deteriorated.

Thus, only when the polyoxymethylene copolymer meets the requirements for the amount of inserted oxyalkylene units and the amount of terminal formate groups specified above, the copolymer has excellent stability, mechanical property and long term resistance to heat and resistance to hot water.

Suitable cationic polymerization catalysts used for obtaining the polymer of the present invention, that is, a polyoxymethylene copolymer having a specified amount of terminal formate groups and excellent in stability, mechanical property and long term resistance to heat and resistance to hot water, are perfluoroalkylsulfonic acids or their derivatives. As specific examples, mention may be made of trifluoromethanesulfonic acid, pentafluoroethanesulfonic acid, heptafluoropropanesulfonic acid, nonafluorobutanesulfonic acid, undecafluoropentanesulfonic acid, perfluoroheptanesulfonic acid, etc.; and, as derivatives, super-strong acid anhydrides such as trifluoromethanesulfonic acid anhydride, pentafluoroethanesulfonic acid anhydride, heptafluoropropanesulfonic acid anhydride, nonafluorobutane sulfonic acid anhydride, undecafluoropentanesulfonic acid anhydride, perfluoroheptanesulfonic acid anhydride, etc.; alkyl esters of super-strong acids such as methyl trifluoromethanesulfonate, ethyl trifluoromethanesulfonate, ethyl pentafluoroethanesulfonate, methyl pentafluoroethanesulfonate, methyl heptafluoropropanesulfonate, etc.; and alkylsilyl esters of super-strong acids such as trimethylsilyl trifluoromethanesulfonate, triethylsilyl trifluoromethanesulfonate; and the like.

Catalysts conventionally used in polymerization or copolymerization of trioxane are Lewis acids, such as boron trifluoride, tin tetrachloride, titanium tetrachloride, phosphorus pentafluoride, and phosphorus pentachloride, and the compounds or the salts thereof. When these catalysts are used, however, hydride shift, which is a side reaction in polymerization, occurs to a large extent, and the amount of terminal formate groups in the resulting copolymer can satisfy the condition of $D_{1710}/D_{1470}$ being not more than 0.025 with much difficulty. Further, these catalysts are insufficient in polymerization activity and cannot achieve a satisfactory polymerization unless the catalysts are used in a high concentration. Consequently, the resulting polymer contains a high concentration of residual catalyst and hence has a low heat stability. Therefore, a complicated process becomes necessary including the washing and removal of the catalyst after polymerization.

The concentration of the catalyst in the present invention should be in the range from $1\times10^{-6}$ to $2\times10^{-5}\%$ by mole relative to the principal monomer. At concentrations lower than said range, no polymerization takes place. At concentrations higher than the range, the catalyst remaining in the polymer will cause depolymerization, which results in low heat stability of the polymer.

Thus, the present inventors have found that when perfluoroalkylsulfonic acids or their derivatives are used as the catalyst, hydride shift, which is a side reaction in polymerization, can be suppressed and a polyoxymethylene copolymer which satisfies the condition of $D_{1710}/D_{1470}$ being not more than 0.025 can be obtained.

Furthermore, the present inventors have found that when perfluoroalkylsulfonic acids or their derivatives are used as the catalyst, the amounts of water and formic acid contained in the monomer greatly affect the polymerization activity of the catalyst. That is, in the present invention, the concentrations of water and formic acid in the monomer must respectively be not more than 40 ppm. When the concentrations are higher than 40 ppm, the polymerization activity lowers markedly. When the catalyst concentration is in the range from $1\times10^{-6}$ to $2\times10^{-5}\%$ by mole relative to the principal monomer, polymerization does not start at all, or gives a very low polymerization yield, which is unpractical.

Molecular weight controlling agents preferably used in the polymerization are alcohols and ethers. Particularly preferred are alkyl ethers, such as methylal and the like. Water, formic acid, methyl formate, etc., also act as a molecular weight controlling agent besides those mentioned above. In the present invention, however, particularly water and formic acid cannot be used because of their effect on catalyst activity described above. Methyl formate also is unpreferable since it forms terminal formate groups. Therefore, when water, formic acid, or methyl formate is contained as impurities in the monomer, the amounts of these impurities must be reduced as much as possible by purifying the monomer in advance of polymerization.

The molecular weight of the polymer of the present invention should be in the range from 10,000 to 200,000. When the molecular weight is not more than 10,000, a satisfactory mechanical property cannot be obtained. On the other hand, when the molecular weight is not less than 200,000, processability of the polymer, such as moldability and extrudability, is markedly poor, which is unpractical.

The polymerization apparatus used in the present invention may be either a batch-wise one or a continuous one and is not particularly limited. As a batch-wise polymerization apparatus, there may generally be used a reaction vessel equipped with a stirrer. As a continuous apparatus, there may be used self-cleaning type blenders, e.g., Ko-Kneaders, twin-screw continuous extruder-blenders and double shaft, paddle type continuous blenders. The polymerization temperature may be 60°–200° C., preferably 60°–140° C. The polymerization time is not particularly restricted but generally selected from the range of not less than 10 seconds and not more than 100 minutes.

After polymerization, the catalyst is usually deactivated since the catalyst contained in the polymer produced causes depolymerization. The deactivation is generally conducted by contacting the polymer with an aqueous solution or an organic solvent containing a basic substance such as triethylamine or by adding and melt-blending a basic substance with the polymer to neutralize and deactivate the catalyst. The present inventors have made extensive study on the methods of deactivating the polymerization catalyst and resultantly found, as an utterly novel method, a highly effective method in which deactivation is conducted by adding an melt-blending with the copolymer a crystalline acidic adsorbent comprising at least two kinds of metal oxides or metal hydroxides. In more particular, to the polyoxymethylene copolymer, there is preferably added and melt-blended 0.001–0.5% by weight, more preferably 0.005–0.1% by weight, of at least one adsorbent selected from a) ion adsorbents comprising at least two kinds of oxides selected from alkali metal oxides, alkaline earth metal oxides, and oxides of trivalent and tetravalent elements, or b) ion adsorbents represented by the formula

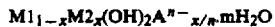

$$M1_{1-x}M2_x(OH)_2A^{n-}{}_{x/n}\cdot mH_2O$$

wherein M1 denotes at least one divalent metal selected from alkaline earth metals; M2 denotes a trivalent metal; $A^{n-}$ denotes an n-valent anion; x is a number satisfying $0<x\leq0.5$; and m is a positive number. The alkali metal oxide may be $Na_2O$, $K_2O$ and the like. The alkaline earth metal oxide may be MgO, CaO and the like. The trivalent and tetravalent element oxide may be $Al_2O_3$, $SiO_2$, $TiO_2$ and the like. Specific examples of the ion adsorbent comprising at least two types of oxides selected from these oxides include $2.5 MgO\cdot Al_2O_3\cdot nH_2O$, $2MgO\cdot 6SiO_2\cdot nH_2O$, $Al_2O_3\cdot 9SiO_2\cdot nH_2O$, $Al_2O_3\cdot Na_2O\cdot 2CO_3\cdot nH_2O$, $Mg_{0.7}Al_{0.3}O_{1.15}$, and the like. In the above formula $M1_{1-x}M2_x(OH)_2A^{n-}{}_{x/n}\cdot mH_2O$, examples of M1 include Mg, Ca etc., examples of M2 include B, Al, Ga, In, Ti, Tl etc., and examples of $A^{n-}$ include $CO_3^{2-}$, $OH^-$, $HCO_3^-$, $H_2PO_4^-$, $NO_3^-$, $I^-$, salicylate ion, citrate ion, tartrate ion, etc. Particularly preferred examples are $CO_3^{2-}$ and $OH^-$. Specific examples of ion adsorbent of this kind are natural hydrotalcite represented by $Mg_{0.75}Al_{0.25}(OH)_2CO_3{}_{0.125}\cdot 0.5H_2O$ and synthetic hydrotalcite represented by $Mg_{4.5}Al_2(OH)_{13}CO_3\cdot 3.5H_2O$ or similar formulas.

The amount of these deactivating agents to be added is preferably 0.001–0.5% by weight, more preferably 0.005–0.1% by weight, relative to the polymer. When the amount is not more than 0.001% by weight the polymerization catalyst is not deactivated sufficiently. When the amount is not less than 0.5% by weight, discoloration occurs during molding and the color tone of the molded article becomes poor. The particle diameter of the deactivating agent is not particularly limited, but is preferably not more than 100 μm to attain enhanced dispersibility. Further, the deactivating agent may be surface-treated to improve the dispersibility into the polymer.

The deactivating agent may be added by feeding it to the polymerization reactor after completion of polymerization or, in a continuous polymerization reactor, by feeding it to the latter stage of the reactor, or by adding and mixing it with the polymer discharged from the reactor. The polymer to which the deactivating agent has been added may be further melt-blended to deactivate the polymerization catalyst more thoroughly. The melt-blending is conducted in the temperature range from the melting point of the polymer to 270° C. The melt-blending apparatus may be, for example, single screw type continuous extruder, Ko-Kneader, twin-screw type continuous extruder, etc.

When the copolymer obtained has an unstable terminal hydroxyl group, the unstable part is decomposed and removed by conventional methods, for example, by heat-treating the copolymer with a basic substance, such as an aqueous triethylamine solution. This operation can be conducted simultaneously with the operation of adding and melt-blending the deactivating agent of the catalyst or in the same melt-blending apparatus as used for the above deactivating operation.

Example

The present invention will be described in more detail below with reference to Examples, but the invention is in no way limited by the Examples.

The items of determination shown in the Examples are as follows.

1. Terminal formate: The copolymer is hot-pressed at 200° C. to form film of 15 μm thickness. The infrared absorption spectrum of the film obtained is taken, from which the ratio of absorbance at $\nu=1710$ cm$^{-1}$ to absorbance at $\nu=1470$ cm$^{-1}$, $D_{1710}/D_{1470}$, is calculated.

2. Inserted amount and sequence of oxyalkylene units: Ten grams of the copolymer is put in 100 ml of aqueous 3N HCl solution and is decomposed by heating the solution in a tightly sealed vessel at 120° C. for 2 hours. After cooling, the amounts of alkylene glycol, dialkylene glycol and trialkylene glycol in the aqueous solution are determined by gas chromatography (FID), and the amount of oxyalkylene units is expressed in terms of % by mole relative to the oxyalkylene units in the copolymer.

As to the sequence of oxyalkylene units, the amount of monoalkylene glycol corresponds to n=1, the amount of dialkylene glycol to n=2 and the amount of trialkylene glycol to n=3.

3. MI: This is determined in accordance with ASTM D-1238-86.

4. Heat stability: Resin is retained in an injection molding machine (Arburg All-rounder 100, a trade name, mfd. by Western Trading K.K.) at a cylinder temperature of 230° C. and then formed into test pieces of 12 by 120 by 3 mm. The time at which a silver streak develops on the test piece surface is determined. The higher the value of the time is, the more excellent is the heat stability of the polymer.

5. Resistance to heat aging: Test pieces in accordance with ASTM D-638 are held in a Geer Oven (type GPS-222, mfd. by Tabai ESPEC CORP.) at 240° C. and then examined for retention of tensile strength.

6. Resistance to hot water: Test pieces in accordance with ASTM D-638 are immersed in hot water (flowing water) adjusted to 120° C. and then examined for retention of tensile strength.

Note) Description of abbreviations in the Tables
A-1: trifluoromethanesulfonic acid
A-2: trifluoromethanesulfonic acid anhydride
A-3: methyl trifluoromethanesulfonate
A-4: trimethylsilyl trifluoromethanesulfonate
A-5: boron trifluoride dibutyl etherate
B-1: $Mg_{0.75}Al_{0.25}O_{1.125}$
B-2: $Al_2O_3.Na_2O.2CO_3.H_2O$
B-3: $Mg_{4.5}Al_2(OH)_{13}CO_3.3H_2O$
B-4: $Al_2O_3.9SiO_2.H_2O$
B-5: triethylamine
C-1: 1,3-dioxolane
C-2: 1,3-propanediol formal
C-3: 1,4-butanediol formal
C-4: 1,6-hexanediol formal
C-5: ethylene oxide Example 1

Two thousand grams of a highly purified trioxane (containing 2 ppm of water and 3 ppm of formic acid), 0.8% by mole per trioxane of 1,3-dioxolane and 0.2% by mole per trioxane of methylal were placed in a jacketed kneader having two Σ-shaped blades and the mixture is heated to 70° C. Then a dioxane solution of trifluoromethanesulfonic acid (0.002 mol/l) is added so as to give a proportion of trifluoromethanesulfonic acid to trioxane of $5 \times 10^{-6}\%$ by mole, and the resulting mixture is allowed to polymerize. Fifteen minutes after the initiation of polymerization, cold water is put into the jacket and the reaction mixture is cooled under nitrogen atmosphere. After 1 hour, the content of the kneader is taken out, and $Mg_{0.75}Al_{0.25}O_{1.125}$ (Kyowaad KW2300, a trade name, mfd. by Kyowa Chemical Industry) is added as a deactivating agent in a proportion of 0.01% by weight relative to the polymer obtained, and the resulting mixture is extruded at 200° C. with a vent-type twin-screw extruder. Further, 1 part by weight of triethylamine, 5 parts by weight of water, and 0.2 part by weight of 2,2-methylenebis(4-methyl-6-t-butylphenol) are added to 100 parts by weight of the polymer extruded above and the mixture is extruded with a vent-type image screw extruder (extrusion temperature: 200° C., vent pressure: 200 torr). The copolymer thus obtained is evaluated for its terminal formate, amount of inserted oxyalkylene units, sequence of oxyalkylene units, MI, heat stability, resistance to heat aging and resistance to hot water. The results are shown in Table 1 and 2.

The polymerization yield is as high as 89% and $D_{1710}/D_{1470}$, which represents the amount of terminal formate groups, is as low as 0.01. With regard to oxyalkylene units, the amount of diethylene glycol relative to the amount of ethylene glycol is as low as 0.3% by mole.

With regard to the properties of the polymer, heat stability is good and tensile strength was excellent. Further, resistance to heat aging and resistance to hot water are both good, the retentions of tensile strength after the lapse of 2000 hours being 80% or more in both tests.

Examples 2 to 18

Polyoxymethylene copolymers are synthesized in the same manner as in Example 1 except for changing the amounts of catalyst, water and formic acid in the monomer, 1,3-dioxolane and methylal and/or varying the type of comonomer and other conditions as shown in Table 1. The polymers obtained are treated and evaluated respectively in the same manner as in Example 1. The results are shown in Tables 1 and 2. Similarly to the results in Example 1, all the copolymers showed a high polymerization yield and a low content of terminal formate groups. Also, they showed a good heat stability and an excellent tensile strength. Further, the copolymers were excellent both in resistance to heat aging and in resistance to hot water, the retentions of tensile strength after the lapse of 2,000 hours being both 80% or more.

Examples 19 to 23

Polyoxymethylene copolymers are synthesized in the same manner as in Example 1 except for changing the type of catalyst, the amount of catalyst and other conditions as shown in Table 1. The polymers obtained are treated and evaluated respectively in the same manner as in Example 1. The results are shown in Tables 1 and 2. Similarly to the results in Example 1, all the copolymers showed a high polymerization yield and a low content of terminal formate groups. Also, they showed a good heat stability and an excellent tensile strength. Further, the copolymers are excellent both in resistance to heat aging and in resistance to hot water, the retentions of tensile strength after the lapse of 2,000 hours being both 80% or more.

Comparative Example 1

A polyoxymethylene copolymer was synthesized by using the apparatus of Example 1 and in the same manner as in Example 1 except that boron trifluoride dibutyl etherate (0.02 mol/l benzene solution) is used as the polymerization catalyst and the catalyst concentration is changed to $5 \times 10^{-3}\%$ by mole relative to trioxane. The polymer taken out from the kneader was melt-blended with a deactivating agent in the same manner as in Example 1. The resulting polymer is treated and evaluated respectively in the same manner as in Example 1. The results are shown in Tables 1 and 2. The polymer showed a high value of terminal formate amount of 0.045 in terms of $D_{1710}/D_{1470}$. It showed a heat stability of 48 min, which is markedly lower as compared with the values in Examples. The copolymer is poor both in resistance to heat aging and in resistance to hot water as compared with the polymers of Examples, the retention of tensile strength after the lapse of 2,000 hours being 60% or less.

Comparative Examples 2 to 8

Polyoxymethylene copolymers are synthesized by using the apparatus of Example 1 and in the same manner as in Example 1 but under the conditions shown in Table 1. Under the conditions of Comparative Examples 3 and 4, the polymerization activity is insufficient and no polymer could be obtained. Under other conditions, polymers could be obtained although the polymerization yields are lower than in Examples. The polymers obtained are treated and evaluated respectively in the same manner as in Comparative Example 1. The results are shown in Tables 1 and 2. All the polymers showed a high value of terminal formate group amount of 0.040 or more in terms of $D_{1710}/D_{1470}$. Also, they showed a heat stability of 50 min or less, which is markedly lower than in Examples. Further, they are poor both in resistance to heat aging and in resistance to hot water, the retentions of tensile strength after the lapse of 2,000 hours being both 50% or less.

Comparative Examples 9 and 10

Polyoxymethylene copolymers are synthesized by using the apparatus of Example 1 and in the same manner as in Comparative Example 1 but under the conditions shown in Table 1. Thirty minutes after the initiation of polymerization, 1 l of an aqueous 5% by weight triethylamine solution is added to deactivate the polymerization catalyst and terminate the polymerization. The polymer obtained is collected by filtration and dried by heating under a nitrogen gas stream at 135° C. Then, to 100 parts by weight of the polymer thus obtained were added 1 part by weight of triethylamine, 5 parts by weight of water and 0.2 part by weight of 2,2-methylenebis(4-methyl-6-t-butylphenol) and the resulting mixture is extruded with a vent-type single screw extruder (extrusion temperature: 200° C., vent pressure: 200 torr).

The polymers thus obtained are evaluated in the same manner as in Example 1. The results are shown in Tables 1 and 2. The copolymers showed a high value of terminal formate group amount of 0.040 or 0.044 in terms of $D_{1710}/D_{1470}$. Also, they showed a heat stability of 35 min or 40 min, which are markedly lower than in Examples. Further, the polymers are very poor both in resistance to heat aging and in resistance to hot water, the determination of tensile strength after the lapse of 2,000 hours being impossible.

Comparative Examples 11 to 16

Polyoxymethylene copolymers are synthesized by using the apparatus of Example 1 and under the same conditions as in Example 1 except for changing the amount of trifluoromethanesulfonic acid of polymerization catalyst and the moisture content and the formic acid concentration in the monomer. The results are shown in Tables 1 and 2. At a catalyst concentration of $1 \times 10^{-6}\%$ by mole relative to trioxane, no polymer could be obtained. Also, at catalyst concentrations of $2 \times 10^{-5}$ to $5 \times 10^{-5}\%$ by mole relative to trioxane, no polymer could be obtained or polymerization yield is very poor, when the amount of water or formic acid in the monomer is 50 ppm or more. Further, at a catalyst concentration of $5 \times 10^{-5}\%$ by mole relative to trioxane, the polymer obtained is very poor in heat stability, resistance to heat aging, and resistance to hot water.

Comparative Examples 17 to 20

Polyoxymethylene copolymers are synthesized by using the apparatus of Example 1 and under the same conditions as in Example 1 except for changing the amount of comonomer. The polymers thus obtained are treated and evaluated respectively in the same manner as in Example 1. The results are shown in Tables 1 and 2. When the amount of inserted oxyalkylene units in the polymer is 0.05% by mole or less, the resulting polymer is markedly poor in heat stability, resistance to heat aging, and resistance to hot water. On the other hand, when the amount of inserted oxyalkylene units in the polymer is 0.6% by mole or more, the polymer showed a markedly low tensile strength.

EXAMPLES 24 to 26

A continuous blending reactor (KRC-Kneader, a trade name, mfd. by Kurimoto Limited) comprised of a barrel of L/D of 14 having a cross section of partially overlapping circles of 50 mm inside diameter and equipped on the outside with a jacket through which a heating medium can be passed, and of two rotating shafts provided inside the barrel and having a number of paddles which engage with one another is used. At a jacket temperature of 80° C. and a number of rotation of 78 rpm, trioxane (2 kg/hour), 1,3-dioxolane (3 levels of 0.3, 0.8 and 1.4% by mole relative to trioxane), methylal (0.3% by mole relative to trioxane) and a dioxane solution (0.002 mole/l) of trifluoromethanesulfonic acid are fed continuously into the reactor so as to give a proportion of trifluoromethanesulfonic acid to trioxane of $1 \times 10^{-5}\%$ by mole, to effect polymerization. The polymer discharged from the polymerization reactor is taken out under nitrogen atmosphere, then $Mg_{0.75}Al_{0.25}O_{1.125}$ (Kyowaad KW2300, a trade name, mfd. by Kyowa Chemical Industry) was added as a deactivating agent to the polymer in a proportion of 0.01% by weight to the polymer, and the resulting mixture is extruded with a vent-type twin-screw extruder at 200° C. To 100 parts by weight of the polymer thus obtained are added 1 part by weight of triethylamine, 5 parts by weight of water and 0.2 part by weight of 2,2-methylenebis(4-methyl-6-t-butylphenol) and the mixture is extruded with a vent-type single screw extruder (extrusion temperature: 200° C., vent pressure: 200 torr). The copolymers thus obtained are evaluated in the same manner as in Example 1. The results are shown in Tables 1 and 2. All the polymers showed a high polymerization yield and a low amount of terminal formate groups. They showed a good heat stability and excellent tensile strength. Further, the copolymers are excellent both in resistance to a heat aging and in resistance to hot water, the retentions of tensile strength after the lapse of 2,000 hours being 80% or more.

Example 27 to 31

Polyoxymethylene copolymers are synthesized under the same conditions as in Example 25. Then, the deactivating agents shown in Table 1 were added to the copolymers, as a deactivating agent used after polymerization, in amounts shown in Table 1, and melt-blended in the same manner as in Example 25. The resulting polymers are treated and evaluated respectively in the same manner as in Example 25. The results are shown in Tables 1 and 2. All the copolymers showed a good heat stability and tensile strength as in Example 1. Further, the copolymers were excellent both in resistance to heat aging and in resistance to hot water, the retentions of tensile strength after the lapse of 2,000 hours being 80% or more.

Comparative Examples 21 to 25

Polyoxymethylene copolymers are synthesized in the same manner as in Example 1 but under the conditions shown in Table 1.

The copolymers are treated in exactly the same manner as in Example 25 except that the copolymers are taken out from the polymerization reactor under a nitrogen atmosphere containing 1% by volume of air, to obtain polyoxymethylene copolymers. The polymers obtained were evaluated in the same manner as in Example 25. The results are shown in Tables 1 and 2. The polymers obtained all showed a terminal formate group content of 0.03 or more in terms of $D_{1710}/D_{1470}$. The polymers were all poorer both in resistance to heat aging and in resistance to hot water than those of Examples, the retentions of tensile strength after the lapse of 2,000 hours being 60% or less.

TABLE 1-1

| | Polymerization catalyst | Catalyst concentration (mol %) | Water in monomer (ppm) | Formic acid in monomer (ppm) | Comonomer | Comonomer amount (mol %) | Deactivating agent | Amount of deactivating agent added (phr) |
|---|---|---|---|---|---|---|---|---|
| Example-1 | A-1 | $5.0 \times 10^{-6}$ | 2 | 3 | C-1 | 0.8 | B-1 | 0.01 |
| Example-2 | A-1 | $5.0 \times 10^{-6}$ | 5 | 10 | C-1 | 0.8 | B-1 | 0.01 |
| Example-3 | A-1 | $1.0 \times 10^{-5}$ | 11 | 8 | C-1 | 0.8 | B-1 | 0.01 |
| Example-4 | A-1 | $1.0 \times 10^{-5}$ | 18 | 19 | C-1 | 0.8 | B-1 | 0.01 |
| Example-5 | A-1 | $2.0 \times 10^{-5}$ | 26 | 8 | C-1 | 0.8 | B-1 | 0.01 |
| Example-6 | A-1 | $2.0 \times 10^{-5}$ | 12 | 22 | C-1 | 0.8 | B-1 | 0.01 |
| Example-7 | A-1 | $2.0 \times 10^{-5}$ | 32 | 22 | C-1 | 0.8 | B-1 | 0.01 |
| Example-8 | A-1 | $1.0 \times 10^{-5}$ | 2 | 3 | C-1 | 0.3 | B-1 | 0.01 |
| Example-9 | A-1 | $1.0 \times 10^{-5}$ | 3 | 3 | C-1 | 0.5 | B-1 | 0.01 |
| Example-10 | A-1 | $1.0 \times 10^{-5}$ | 3 | 3 | C-1 | 1 | B-1 | 0.01 |
| Example-11 | A-1 | $1.0 \times 10^{-5}$ | 5 | 8 | C-1 | 1.4 | B-1 | 0.01 |
| Example-12 | A-1 | $1.0 \times 10^{-5}$ | 3 | 8 | C-2 | 0.8 | B-1 | 0.01 |
| Example-13 | A-1 | $1.0 \times 10^{-5}$ | 3 | 8 | C-3 | 0.8 | B-1 | 0.01 |
| Example-14 | A-1 | $1.0 \times 10^{-5}$ | 2 | 5 | C-4 | 0.8 | B-1 | 0.01 |
| Example-15 | A-1 | $1.0 \times 10^{-5}$ | 3 | 8 | C-1 | 0.8 | B-1 | 0.01 |
| Example-16 | A-1 | $1.0 \times 10^{-5}$ | 3 | 8 | C-1 | 0.8 | B-1 | 0.01 |
| Example-17 | A-1 | $1.0 \times 10^{-5}$ | 3 | 8 | C-1 | 0.8 | B-1 | 0.01 |
| Example-18 | A-1 | $1.0 \times 10^{-5}$ | 3 | 8 | C-1 | 0.8 | B-1 | 0.01 |
| Example-19 | A-2 | $5.0 \times 10^{-6}$ | 2 | 5 | C-1 | 0.8 | B-1 | 0.01 |
| Example-20 | A-2 | $1.0 \times 10^{-5}$ | 17 | 25 | C-1 | 1.4 | B-1 | 0.01 |
| Example-21 | A-3 | $5.0 \times 10^{-6}$ | 2 | 8 | C-1 | 0.8 | B-1 | 0.01 |
| Example-22 | A-3 | $1.0 \times 10^{-5}$ | 28 | 5 | C-1 | 0.3 | B-1 | 0.01 |
| Example-23 | A-4 | $1.0 \times 10^{-5}$ | 5 | 8 | C-1 | 0.8 | B-1 | 0.01 |
| Example-24 | A-1 | $1.0 \times 10^{-5}$ | 3 | 8 | C-1 | 0.3 | B-1 | 0.01 |
| Example-25 | A-1 | $1.0 \times 10^{-5}$ | 3 | 8 | C-1 | 0.8 | B-1 | 0.01 |
| Example-26 | A-1 | $1.0 \times 10^{-5}$ | 3 | 8 | C-1 | 1.4 | B-1 | 0.01 |
| Example-27 | A-1 | $1.0 \times 10^{-5}$ | 3 | 8 | C-1 | 0.8 | B-1 | 0.005 |
| Example-28 | A-1 | $1.0 \times 10^{-5}$ | 3 | 8 | C-1 | 0.8 | B-1 | 0.05 |

| | Polymerization yield (%) | Formate terminal $D_{1710}/D_{1470}$ | Inserted oxyalkylene unit amount (mol %) | Sequence (mol %) n = 1 | n > 2 |
|---|---|---|---|---|---|
| Example-1 | 89 | 0.010 | 0.24 | 99.7 | 0.3 |
| Example-2 | 88 | 0.011 | 0.25 | 99.8 | 0.6 |
| Example-3 | 92 | 0.013 | 0.23 | 99.4 | 0.6 |
| Example-4 | 90 | 0.018 | 0.23 | 99.5 | 0.5 |
| Example-5 | 95 | 0.014 | 0.22 | 99.2 | 0.8 |
| Example-6 | 93 | 0.020 | 0.23 | 99.4 | 0.6 |
| Example-7 | 91 | 0.024 | 0.23 | 99.5 | 0.5 |
| Example-8 | 95 | 0.013 | 0.08 | 100 | — |
| Example-9 | 94 | 0.013 | 0.15 | 100 | — |
| Example-10 | 93 | 0.013 | 0.31 | 98.5 | 1.5 |
| Example-11 | 90 | 0.015 | 0.43 | 97.2 | 2.8 |

TABLE 1-1-continued

| | | | | | |
|---|---|---|---|---|---|
| Example-12 | 93 | 0.014 | 0.26 | == | == |
| Example-13 | 91 | 0.015 | 0.27 | == | == |
| Example-14 | 91 | 0.015 | 0.27 | == | == |
| Example-15 | 89 | 0.013 | 0.25 | 99.5 | 0.5 |
| Example-16 | 89 | 0.013 | 0.25 | 99.4 | 0.6 |
| Example-17 | 94 | 0.015 | 0.23 | 99.7 | 0.3 |
| Example-18 | 94 | 0.014 | 0.22 | 99.7 | 0.3 |
| Example-19 | 88 | 0.012 | 0.23 | 99.5 | 0.5 |
| Example-20 | 90 | 0.018 | 0.42 | 97.4 | 2.6 |
| Example-21 | 86 | 0.014 | 0.22 | 99.6 | 0.4 |
| Example-22 | 89 | 0.017 | 0.09 | 100 | — |
| Example-23 | 92 | 0.015 | 0.23 | 99.5 | 0.5 |
| Example-24 | 95 | 0.012 | 0.08 | 100 | — |
| Example-25 | 94 | 0.012 | 0.22 | 99.6 | 0.4 |
| Example-26 | 94 | 0.012 | 0.42 | 98.4 | 1.6 |
| Example-27 | == | == | == | == | == |
| Example-28 | | | | | |

TABLE 1-2

| | Polymerization catalyst | Catalyst concentration (mol %) | Water in monomer (ppm) | Formic acid in monomer (ppm) | Comonomer | Comonomer amount (mol %) | Deactivating agent | Amount of deactivating agent added (phr) |
|---|---|---|---|---|---|---|---|---|
| Example-29 | A-1 | $1.0 \times 10^{-5}$ | 3 | 8 | C-1 | 0.8 | B-2 | 0.01 |
| Example-30 | A-1 | $1.0 \times 10^{-5}$ | 3 | 8 | C-1 | 0.8 | B-3 | 0.01 |
| Example-31 | A-1 | $1.0 \times 10^{-5}$ | 3 | 8 | C-1 | 0.8 | B-4 | 0.02 |
| Comp. Example-1 | A-5 | $5.0 \times 10^{-3}$ | 2 | 3 | C-1 | 0.8 | B-1 | 0.01 |
| Comp. Example-2 | A-5 | $2.0 \times 10^{-3}$ | 2 | 3 | C-1 | 0.8 | B-1 | 0.01 |
| Comp. Example-3 | A-5 | $1.0 \times 10^{-3}$ | 2 | 3 | C-1 | 0.5 | == | == |
| Comp. Example-4 | A-5 | $1.0 \times 10^{-3}$ | 2 | 3 | C-1 | 1.4 | == | == |
| Comp. Example-5 | A-5 | $2.0 \times 10^{-3}$ | 2 | 3 | C-1 | 0.5 | B-1 | 0.01 |
| Comp. Example-6 | A-5 | $2.0 \times 10^{-3}$ | 2 | 3 | C-1 | 1.4 | B-1 | 0.01 |
| Comp. Example-7 | A-5 | $2.0 \times 10^{-3}$ | 2 | 3 | C-5 | 0.8 | B-1 | 0.01 |
| Comp. Example-8 | A-5 | $2.0 \times 10^{-3}$ | 2 | 3 | C-5 | 1.4 | B-1 | 0.01 |
| Comp. Example-9 | A-5 | $2.0 \times 10^{-3}$ | 2 | 3 | C-5 | 0.8 | B-5 | == |
| Comp. Example-10 | A-5 | $2.0 \times 10^{-3}$ | 2 | 3 | C-5 | 1.4 | B-5 | == |
| Comp. Example-11 | A-1 | $1.0 \times 10^{-6}$ | 2 | 3 | C-1 | 0.8 | == | == |
| Comp. Example-12 | A-1 | $2.0 \times 10^{-5}$ | 52 | 8 | C-1 | 0.8 | | |
| Comp. Example-13 | A-1 | $2.0 \times 10^{-5}$ | 2 | 55 | C-1 | 0.8 | == | == |
| Comp. Example-14 | A-1 | $5.0 \times 10^{-5}$ | 52 | 8 | C-1 | 0.8 | B-1 | 0.05 |
| Comp. Example-15 | A-1 | $5.0 \times 10^{-5}$ | 2 | 55 | C-1 | 0.8 | == | == |
| Comp. Example-16 | A-1 | $5.0 \times 10^{-5}$ | 2 | 3 | C-1 | 0.8 | B-1 | 0.01 |
| Comp. Example-17 | A-1 | $1.0 \times 10^{-5}$ | 2 | 3 | C-1 | 0.18 | B-1 | 0.01 |
| Comp. Example-18 | A-1 | $1.0 \times 10^{-5}$ | 2 | 3 | C-1 | 0.1 | B-1 | 0.01 |
| Comp. Example-19 | A-1 | $1.0 \times 10^{-5}$ | 2 | 3 | C-1 | 2.2 | B-1 | 0.01 |
| Comp. Example-20 | A-1 | $1.0 \times 10^{-5}$ | 2 | 3 | C-1 | 3.5 | B-1 | 0.01 |
| Comp. Example-21 | A-1 | $1.0 \times 10^{-5}$ | 3 | 8 | C-1 | 0.3 | B-1 | 0.01 |
| Comp. Example-22 | A-1 | $1.0 \times 10^{-5}$ | 3 | 8 | C-1 | 0.3 | B-1 | 0.05 |
| Comp. Example-23 | A-1 | $1.0 \times 10^{-5}$ | 3 | 8 | C-1 | 0.8 | B-1 | 0.01 |
| Comp. Example-24 | A-1 | $1.0 \times 10^{-5}$ | 3 | 8 | C-1 | 0.8 | B-1 | 0.05 |
| Comp. Example-25 | A-1 | $1.0 \times 10^{-5}$ | 3 | 8 | C-1 | 1.4 | B-1 | 0.01 |

| Polymerization yield (%) | Formate terminal $D_{1710}/D_{1470}$ | Inserted oxyalkylene unit amount (mol %) | Sequence (mol %) | |
|---|---|---|---|---|
| | | | $n = 1$ | $n > 2$ |

TABLE 1-2-continued

| | | | | | |
|---|---|---|---|---|---|
| Example-29 | = = | = = | = = | = = | = = |
| Example-30 | = = | = = | = = | = = | = = |
| Example-31 | = = | = = | = = | = = | = = |
| Comp. Example-1 | 84 | 0.045 | 0.23 | 93.6 | 6.4 |
| Comp. Example-2 | 72 | 0.041 | 0.25 | 94.3 | 5.7 |
| Comp. Example-3 | Non-polymerizable | = = | = = | = = | = = |
| Comp. Example-4 | Non-polymerizable | = = | = = | = = | = = |
| Comp. Example-5 | 61 | 0.047 | 0.17 | 93.8 | 6.2 |
| Comp. Example-6 | 55 | 0.042 | 0.44 | 94.1 | 5.9 |
| Comp. Example-7 | 56 | 0.048 | 0.28 | 92.2 | 7.8 |
| Comp. Example-8 | 52 | 0.047 | 0.45 | 90.8 | 9.2 |
| Comp. Example-9 | 70 | 0.040 | 0.28 | 93.2 | 6.8 |
| Comp. Example-10 | 65 | 0.044 | 0.45 | 89.5 | 10.5 |
| Comp. Example-11 | Non-polymerizable | = = | = = | = = | = = |
| Comp. Example-12 | 42 | = = | = = | = = | = = |
| Comp. Example-13 | Non-polymerizable | = = | = = | = = | = = |
| Comp. Example-14 | 64 | 0.030 | 0.28 | 98.4 | 1.6 |
| Comp. Example-15 | 39 | = = | = = | = = | = = |
| Comp. Example-16 | 95 | 0.030 | 0.24 | 98.9 | 1.2 |
| Comp. Example-17 | 92 | 0.013 | 0.05 | 100 | — |
| Comp. Example-18 | 92 | 0.012 | 0.03 | 100 | — |
| Comp. Example-19 | 90 | 0.015 | 0.62 | 97.8 | 3.2 |
| Comp. Example-20 | 90 | 0.018 | 1.02 | 96.8 | 4.2 |
| Comp. Example-21 | 95 | 0.040 | 0.08 | 100 | — |
| Comp. Example-22 | 95 | 0.040 | 0.08 | 100 | — |
| Comp. Example-23 | 92 | 0.032 | 0.23 | 99.7 | 0.3 |
| Comp. Example-24 | 92 | 0.032 | 0.23 | 99.7 | 0.3 |
| Comp. Example-25 | 90 | 0.048 | 0.42 | 97.5 | 2.5 |

TABLE 2-1

| | M.p. (°C.) | MI (g/10 min) | Heat stability (min) | Tensile strength (kg/cm²) |
|---|---|---|---|---|
| Example-1 | 172.2 | 10.6 | 101 | 712 |
| Example-2 | 172.2 | 10.5 | 98 | 713 |
| Example-3 | 172.5 | 9.2 | 90 | 715 |
| Example-4 | = = | 9.5 | 91 | 715 |
| Example-5 | 172.8 | 8.8 | 86 | 715 |
| Example-6 | = = | 9.2 | 85 | 715 |
| Example-7 | = = | 9.5 | 85 | 715 |
| Example-8 | 173.8 | 8.8 | 86 | 732 |
| Example-9 | 173.1 | 9.0 | 87 | 725 |
| Example-10 | 171.1 | 9.2 | 94 | 709 |
| Example-11 | 170.2 | 10.6 | 103 | 702 |
| Example-12 | 172.0 | 9.5 | 92 | 712 |
| Example-13 | 171.8 | 9.2 | 90 | 712 |
| Example-14 | 171.8 | 9.2 | 95 | 712 |
| Example-15 | 172.1 | 45.2 | 90 | 712 |
| Example-16 | 172.3 | 32.0 | 93 | 712 |
| Example-17 | 172.5 | 3.2 | 96 | 715 |
| Example-18 | 172.5 | 1.4 | 99 | 715 |
| Example-19 | 172.4 | 9.0 | 96 | 715 |
| Example-20 | 170.1 | 9.3 | 96 | 702 |
| Example-21 | 162.5 | 8.8 | 97 | 715 |
| Example-22 | 173.8 | 9.0 | 94 | 733 |
| Example-23 | = = | 9.5 | 91 | 715 |
| Example-24 | 173.6 | 8.9 | 95 | 732 |
| Example-25 | 172.5 | 9.2 | 100 | 715 |
| Example-26 | 170.2 | 9.2 | 95 | 702 |
| Example-27 | = = | 9.2 | 91 | 715 |
| Example-28 | = = | 9.2 | 99 | 715 |

| | Heat aging resistance (%) | | | Hot water resistance (%) | | |
|---|---|---|---|---|---|---|
| | 500 hr | 1,000 hr | 2,000 hr | 500 hr | 1,000 hr | 2,000 hr |
| Example-1 | 100 | 100 | 90 | 100 | 99 | 86 |
| Example-2 | 100 | 100 | 92 | 100 | 98 | 85 |
| Example-3 | 100 | 99 | 91 | 100 | 98 | 85 |
| Example-4 | 100 | 97 | 90 | 100 | 97 | 84 |
| Example-5 | 100 | 98 | 91 | 100 | 97 | 84 |
| Example-6 | 100 | 97 | 88 | 100 | 95 | 85 |
| Example-7 | 100 | 98 | 90 | 100 | 95 | 85 |
| Example-8 | 100 | 96 | 88 | 100 | 96 | 83 |
| Example-9 | 100 | 97 | 89 | 100 | 96 | 83 |
| Example-10 | 100 | 99 | 94 | 100 | 98 | 87 |
| Example-11 | 100 | 100 | 95 | 100 | 98 | 92 |
| Example-12 | 100 | 99 | 90 | 100 | 98 | 86 |
| Example-13 | 100 | 98 | 90 | 100 | 98 | 85 |
| Example-14 | 100 | 98 | 89 | 100 | 99 | 86 |
| Example-15 | 100 | 98 | 92 | 100 | 98 | 85 |
| Example-16 | 100 | 98 | 92 | 100 | 98 | 85 |
| Example-17 | 100 | 99 | 94 | 100 | 98 | 87 |
| Example-18 | 100 | 99 | 94 | 100 | 98 | 87 |
| Example-19 | 100 | 100 | 94 | 100 | 99 | 86 |
| Example-20 | 100 | 98 | 92 | 100 | 98 | 84 |
| Example-21 | 100 | 100 | 95 | 100 | 99 | 86 |
| Example-22 | 100 | 99 | 92 | 100 | 98 | 85 |
| Example-23 | 100 | 98 | 92 | 100 | 98 | 84 |
| Example-24 | 100 | 97 | 90 | 100 | 98 | 86 |
| Example-25 | 100 | 99 | 94 | 100 | 99 | 90 |
| Example-26 | 100 | 100 | 95 | 100 | 100 | 92 |
| Example-27 | 100 | 98 | 90 | 100 | 99 | 84 |
| Example-28 | 100 | 97 | 89 | 100 | 99 | 92 |

TABLE 2-2

| | M.p. (°C.) | MI (g/10 min) | Heat stability (min) | Tensile strength (kg/cm²) |
|---|---|---|---|---|
| Comp. Example-17 | 174.3 | 9.4 | 60 | 732 |
| Comp. Example-18 | 174.5 | 9.5 | 55 | 735 |
| Comp. Example-19 | 168.0 | 9.8 | 101 | 668 |
| Comp. Example-20 | 165.0 | 9.5 | 101 | 647 |
| Comp. Example-21 | 173.6 | 10.0 | 95 | 730 |
| Comp. Example-22 | 173.6 | 10.0 | 104 | 730 |
| Comp. Example-23 | 171.0 | 9.8 | 100 | 715 |
| Comp. Example-24 | 171.0 | 9.8 | 98 | 715 |
| Comp. Example-25 | 170.0 | 9.8 | 107 | 705 |

Heat aging

TABLE 2-2-continued

|  | resistance (%) | | | Hot water resistance (%) | | |
|---|---|---|---|---|---|---|
|  | 500 hr | 1,000 hr | 2,000 hr | 500 hr | 1,000 hr | 2,000 hr |
| Example-29 | 100 | 98 | 92 | 100 | 99 | 86 |
| Example-30 | 100 | 98 | 92 | 100 | 99 | 86 |
| Example-31 | 100 | 97 | 90 | 100 | 99 | 88 |
| Comp. Example-1 | 100 | 76 | 52 | 100 | 67 | 26 |
| Comp. Example-2 | 100 | 75 | 48 | 100 | 60 | Unmeasurable |
| Comp. Example-3 | = = | = = | = = | 100 | = = | = = |
| Comp. Example-4 | = = | = = | = = | 100 | = = | = = |
| Comp. Example-5 | 100 | 75 | 49 | 100 | 62 | 22 |
| Comp. Example-6 | 100 | 77 | 50 | 100 | 62 | 25 |
| Comp. Example-7 | 100 | 71 | 43 | 100 | 60 | 22 |
| Comp. Example-8 | 100 | 70 | 45 | 100 | 62 | 27 |
| Comp. Example-9 | 100 | 67 | Unmeasurable | 98 | 54 | Unmeasurable |
| Comp. Example-10 | 100 | 70 | Unmeasurable | 99 | 58 | Unmeasurable |
| Comp. Example-11 | = = | = = | = = | = = | = = | = = |
| Comp. Example-12 | = = | = = | = = | = = | = = | = = |
| Comp. Example-13 | = = | = = | = = | = = | = = | = = |
| Comp. Example-14 | 100 | 77 | 41 | 100 | 68 | 35 |
| Comp. Example-15 | = = | = = | = = | = = | = = | = = |
| Comp. Example-16 | 100 | 80 | 55 | 100 | 70 | 36 |
| Comp. Example-17 | 100 | 85 | 62 | 100 | 78 | 52 |
| Comp. Example-18 | 100 | 81 | 49 | 100 | 72 | 38 |
| Comp. Example-19 | = = | = = | = = | = = | = = | = = |
| Comp. Example-20 | = = | = = | = = | = = | = = | = = |
| Comp. Example-21 | 100 | 100 | 50 | 100 | 65 | 23 |
| Comp. Example-22 | 100 | 99 | 43 | 100 | 70 | 37 |
| Comp. Example-23 | 100 | 98 | 55 | 100 | 70 | 35 |
| Comp. Example-24 | 100 | 97 | 45 | 100 | 72 | 33 |
| Comp. Example-25 | 100 | 99 | 40 | 100 | 66 | 27 |

INDUSTRIAL APPLICABILITY

The copolymer of the present invention is excellent in strength, rigidity, fatigue characteristic, friction abrasion characteristic, heat stability, etc. The copolymer can be put to various uses for which prior polyoxymethylene homopolymers and copolymers have been used, for example, mechanism elements such as cams, gears, switches, handles, levers, reels, hubs and bearings; miscellaneous goods such as fasteners, buttons and clips; and further a large number of automotive, electric and electronic parts. Further, the copolymer can be used, by virtue of its excellent characteristics, for parts of water treatment, kitchen or toilet goods, such as pump impellers, pump casings, shower nozzles and taps. The copolymer can also be formed into extruded rods or sheets, or blow-molded. It can be incorporated with known additives, for example, various antioxidants, heat stabilizers, pigments, nucleating agents, antistatic agents, weatherproofing agents, etc., and various reinforcing materials, such as carbon fiber, glass fiber, glass beads, talc, mica, etc. Further, the copolymer can be made into polymer blends and polymer alloys with such polymers as polyurethane, PMMA, PE, etc.

We claim:

1. A polyoxymethylene copolymer having a molecular weight of 10,000–200,000 comprising oxymethylene units (—CH$_2$O)— and oxyalkylene units

wherein R and R$_0$ may be the same or different and are each selected from hydrogen, an alkyl group or an aryl group, n is 1 to 5, and m is 2 to 6, and wherein (a) the proportion of oxyalkylene units to oxymethylene units is 0.07–0.5% by mole, and (b) the ratio of the absorbance of terminal formate groups to methylene groups in the infrared spectrophotometry of the polymer is not more than 0.025.

2. The polyoxymethylene copolymer according to claim 1, wherein in the oxyalkylene units, the proportion of oxyalkylene units of n=1 is not less than 95% by mole of the whole oxyalkylene units.

3. The polyoxymethylene copolymer according to claim 1 or 2, wherein the ratio of the absorbance of terminal formate groups to methylene groups in the infrared spectrophotometry of the polymer is not more than 0.020.

4. The polyoxymethylene copolymer according to claim 1 or 2 the terminal groups are each selected from the group consisting of an alkoxy group, a hydroxyalkoxy group and a formate group.

5. A composition of the polyoxymethylene copolymer which comprises, relative to the polyoxymethylene copolymer claimed in claim 1, 0.001–0.5% by weight of at least one ion adsorbent selected from (a) ion adsorbents comprising as the main components at least two oxides selected from alkali metal oxides, alkaline earth metal oxides or oxides of trivalent or tetravelent elements, or (b) ion adsorbents represented by the general formula

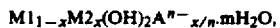

wherein M1 denotes at least one divalent metal selected from alkaline earth metals, M2 denotes a trivalent metal, A$^{n-}$ denotes an n-valent anion, x is a number satisfying $0 < x \leq 0.5$, and m is a positive number.

6. A process for producing a polyoxymethylene copolymer composition which comprises copolymerizing a mixture of a cyclic oligomer or cyclic acetal of formaldehyde as the principal monomer with a comonomer copolymerizable therewith, in the presence of a perfluoroalkylsulfonic acid or a perfluoroalkysulfonic acid derivative as the polymerization catalyst in an amount of $1 \times 10^{-6} - 2 \times 10^{-5}$% by mole relative to the principal monomer, wherein the content of water and formic acid in the monomer mixture are, respectively, not more than 40 ppm by weight and deactivating the polymerization catalyst in the resulting polyoxymethylene copolymer, which comprises adding and melt-blending at least one ion adsorbent selected from (a) ion adsorbents comprising as the main components at least two kinds of oxides selected from alkali metal oxides, alkaline earth metal oxides, and oxides of trivalent and tetravalent elements, or (b) ion adsorbents represented by the formula

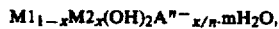
$$M1_{1-x}M2_x(OH)_2A^{n-}{}_{x/n}\cdot mH_2O,$$

wherein M1 denotes at least one divalent metal selected from alkaline earth metals, M2 denotes a trivalent metal, $A^{n-}$ denotes an n-valent anion, x satisfies $0<x\leq 0.5$, and m is a positive number, in an amount of 0.001–0.5% by weight relative to the polymer to obtain the polyoxymethylene copolymer composition.

7. The polyoxymethylene copolymer according to claim 1 or 2, wherein the proportion of oxyalkylene units to oxymethylene units is 0.1 to 0.3% by mole.

8. The composition according to claim 5, wherein the proportion of oxyalkylene units to oxymethylene units in said polyoxymethylene copolymer is 0.1 to 0.3% by mole.

9. The composition according to claim 5, wherein said ion adsorbent is contained in an amount of 0.005 to 0.1% by weight, based on the weight of said polyoxymethylene copolymer.

10. The process according to claim 6, wherein said ion adsorbent is added in an amount of 0.005 to 0.1% b weight, based on the weight of said polyoxymethylene copolymer.

* * * * *

UNITED STATES PATENT AND TRADEMARK OFFICE
CERTIFICATE OF CORRECTION

PATENT NO. : 5,288,840
DATED : February 22, 1994
INVENTOR(S) : Morishita et al.

It is certified that error appears in the above-identified patent and that said Letters Patent is hereby corrected as shown below:

On the title page item [73], change "Asahi Kasei Kabushiki Kaisha" to
        --Asahi Kasei Kogyo Kabushiki Kaisha--

Signed and Sealed this

Fourteenth Day of March, 1995

*Attest:*

BRUCE LEHMAN

*Attesting Officer*     *Commissioner of Patents and Trademarks*